United States Patent

[11] 3,558,886

[72] Inventor David Carver
  14132 Runnymede St., Van Nuys, Calif. 91405
[21] Appl. No. 818,782
[22] Filed Apr. 23, 1969
[45] Patented Jan. 26, 1971

[54] METHOD OF DISCOVERING IMPERFECTIONS IN BONDED LAMINATED STRUCTURES
  10 Claims, No Drawings

[52] U.S. Cl. .................................................... 250/65,
  156/64; 250/71
[51] Int. Cl. ...................................................... G01n 21/16
[50] Field of Search .......................................... 156/64,
  378; 250/71, 71T, 65, 65.1, 83.31R

[56] References Cited
UNITED STATES PATENTS
2,259,400 10/1941 Switzer .......................... 250/71T FOREIGN PATENTS
509,308 7/1939 Great Britain ................ 250/71

Primary Examiner—James W. Lawrence
Assistant Examiner—A. L. Birch
Attorneys—George C. Sullivan and Ralph M. Flygare ABSTRACT: The method of making and recording a nondestructive test of a bonded and/or brazed structure wherein a temperature sensitive coating is applied to the surface of the test structure after which heat energy is exposed to the coated surface, resulting in a visible isothermal pattern which denotes any imperfections in the bond. The coating is then physically marked to record any area of imperfection. The coating is then removed from the structure in substantially a single piece, thereby forming a permanent record as to the quality of the bond and the location of any imperfections in the structure.

3,558,886

METHOD OF DISCOVERING IMPERFECTIONS IN BONDED LAMINATED STRUCTURES

BACKGROUND OF THE INVENTION

This invention relates to the method of employing thermographic paints. A thermographic paint is a paint which contains a luminescent material. With such a paint in contact with an object surface, upon subjecting the paint to ultraviolet (UV) radiation, the luminescent material radiantly reemits the absorbed UV energy at a visible wave length. This reemission of the UV energy varies indirectly with the temperature of the paint. The greater the reemission, the lower the temperature, and conversely, the less the reemission, the higher the temperature. In effect, a pattern of isotherms is produced upon the surface of the paint. Although the actual temperature of the paint surface could be measured, it is more efficient to merely observe the pattern distinctions.

The basic concept of discovering flaws by applying heat energy to a bonded laminated object such as thin sheets of honeycomb or other substrates is common in prior methods of thermal nondestructive testing. Such methods include the use of an infrared radiometer, a cholesteric liquid crystal composition or the use of thermographic phosphors. In all of these methods the basic principle is that a flaw in the bond adhesive, whether an air pocket or a void in the adhesive, has a significantly lower thermal conductivity than the adhesive. This lower thermal conductivity acts as a resistance to the transfer of heat energy and, therefore, a "build-up" of thermal energy occurs resulting in a rise in temperature.

There are available many types of thermographic phosphors. For example, a common type of phosphor emits a particular color when excited by a certain type of electromagnetic radiation. However, one main disadvantage which phosphors have that have been used heretofore is that substantial variations in temperature are required to provide a significant change in brightness. As it is of primary advantage to employ a phosphor which produces visible isotherms, brightness is important. A minor flaw may not be noticed as only a small change in brightness has occurred. Recently, certain types of phosphors have been developed to emphasize this variation so that a small change in temperature produces a relatively large change in fluorescent brightness. Such a phosphor may comprise a composition of zinc cadmium sulfide with a silver activator and a trace of nickel as poison. With constant intensity of ultraviolet radiation, the phosphor's reemission may change as much as 10 percent per degree F.

In actual use of such a phosphor the painted surface is irradiated with both infrared and ultraviolet radiation. The infrared radiation will so degrade the reemission efficiency of the phosphor as to quench it in those areas where a threshold temperature is reached. In the cooler areas the coating will visibly fluoresce under the ultraviolet radiation. Where the structure is properly bonded, a heat sink will exist which carries away the applied thermal energy at a rate sufficient to maintain the phosphor below the quenching threshold. In those areas where there is a void or a lack of bonding, the heat energy will "build-up" and the local temperature will be maintained at a sufficiently high temperature as to result in a diminution of fluorescence. Thus, in the usual case, flaws will appear as shadows or darkened areas in the fluorescing field, from the side being viewed. Special cases will be discussed hereinafter.

A shortcoming of the prior art method of nondestructive testing, by means of thermographic paints, is that no permanent record of the isotherms is easily made. That is, upon removal of the radiant energy, the visible pattern ceases to exist. Due to the combination of ultraviolet and infrared radiation and the relatively low level of the visible light from the fluorescing pattern, it is difficult and impractical to obtain a photographic record of the isotherms. Thus, there is no way a permanent record of the inspection can be easily made.

SUMMARY OF THE INVENTION

The method of this invention relates to the use of a thermographic coating or film substantially as previously defined which basically comprises a zinc cadmium sulfide phosphor employing a silver activator and a trace of nickel disposed in a suitable vehicle. The phosphor is completely suspended in the vehicle to permit easy and even application by means of a brush, roller or spray gun.

The method of this invention comprises applying the coating to the structure surface, permitting the coating to dry or otherwise stabilize into an integral sheet or film, exposing the coating to both ultraviolet and infrared heat energy, observing the resulting isotherms upon the coating surface, physically marking the anomalies or darkened areas upon the surface of the coating prior to removal of the heat source, and then easily removing the coating, as a sheet, in its entirety from the surface of the structure.

Although the normal procedure is to expose the anterior of the coating directly to the heat source, in certain instances it may be possible to expose the heat source to the posterior surface of the structure, and in some instances within the structure itself. If heat is applied to the underside or posterior of the test article, the temperature of the top or anterior surface over the flaw will be significantly lower than the surrounding top sheet temperature since there would be a discontinuity in the thermal path from one surface to the other. Therefore, if the heat is applied to the underside, and is viewed at the top, the flaw will appear brighter than the surrounding surface. However, this type of anomaly may be recorded in the same manner as the normal procedure, namely by outlining the isothermal pattern with a marking device. Any method of heat application can be used that does not illuminate the test surface by white, or other interfering, light. For example, the test article may have the posterior surface contact a molten low temperature alloy bath such as bismuth alloys (Cerrosafe molten at 190° F.; Cerrobend molten at 165° F.).

DETAILED DESCRIPTION OF THE INVENTION

The coating vehicles which may be used in the practice of the invention are those which permit stripping of the formed coating from the test article or structure and can be either water based (latex) or organic-solvent based (organosol). A suitable thermographic paint is described in copending Pat. application Ser. No. 705,618, filed Feb. 15, 1968, entitled "Thermal Image Inspection Paint," of common assignee. The vehicle and phosphor dry into a leathery-type of sheet. Heat energy from hot air, at approximately 160° F., is applied to the dried coating simultaneously with the application of the UV radiation. The heat source is slowly passed over the surface and where poor bonding or voids exist between the surface layer and the substrate, dark areas appear on the surface of the coating. These dark areas are to be marked directly on the coating as by a felt tip marking pen. The degree of lightness of these areas will indicate the degree, shape and size of lamination separation or voids.

The coating can be readily peeled off or otherwise removed by hand, or by slitting a side or end of the coating and injecting a small amount of air from an air hose to lift the coating from the supporting surface. The coating, if carefully removed, will be retained in the form of a single sheet. Preferably, the coating material should be translucent, thereby permitting copies of the single sheet coating to be made, upon removal, by means of an Ozalid or a blueprint machine.

Additionally, if desired, the "marked on" coating can be "peeled back" and a piece of carbon paper interposed between the coating and the test structure surface. The coating is then replaced and the outline of the imperfection traced on the coating so as to transfer a carbon copy impression directly on to the structure. Thus, in addition to the permanent record made on the coating sheet, a record is made on the test structure itself. It is to be understood that the term "carbon paper" refers to any suitable and well-known impression transfer sheet, and need not be limited to carbon paper per se.

There follows a more detailed description of a typical test procedure utilizing the method of the invention. The surface to which the coating is to be applied is first cleaned with aliphatic naphtha or other suitable solvent and dried with clean compressed air. Approximately a 0.005 inch maximum thick coating of the thermographic paint is applied as by spraying onto the surface. The coating is then allowed to air dry. The coated surface is then exposed to an ultraviolet light source. The UV source should radiate in the longer wavelength end of the UV band, namely 3000 Angstroms to 4000 Angstroms. UV in this wavelength is popularly called "black light" and is obtainable from the following sources: (1) high-pressure mercury arc light covered with a filter to remove the visible light and (2) the fluorescent lamp made up with a special phosphor and covered with a filter to remove the visible light. The optimum wavelength of UV radiation will depend upon the type of phosphor used, but typically is of the order of 3600 Angstroms. A hot air source is then passed over the area to be inspected while maintaining a spacing of approximately 3 inches from the surface so as not to exceed a maximum surface temperature of 160° F. Higher temperatures are undesirable since they may have an adverse affect on the part being tested. The surface temperature of the part being inspected should normally be held to approximately 120° F. The hot air source may comprise a Model HG—751 hot air gun as manufactured by Master Applicances Corporation of Racine, Wisconsin. Visible variations in the intensity of fluorescence are indicative of the thermal conductivity of the surface, as related to unbonded areas. As heat is applied to the coating, the normal fluorescence of the paint begins to darken with the increase in temperature. The presence of a void in the bond line will become visible as an area (corresponding in size and shape to the void) that is visibly darker than the surrounding areas. This is due to the locally higher temperature of the void. If the part surface is overheated, then the whole area being viewed appears dark and visual definition is lost. In a practical embodiment of the invention it has been found that a ½-inch diameter void in a laminated panel can be reliably detected through an aluminum top sheet having a thickness up to 0.035 inch. Isotherm patterns are developed by the high rate of heat input to the fluorescing surface and vary with differences in the thermal conductivity through the structure. Imperfections such as air gaps and blisters, as well as the type and mass of the base metal, will cause certain sections of the surface to rapidly heat up and therefore appear dark (hot). Bonded homogeneous areas or areas having large thermal mass "heat up" more slowly and appear light (cold). The difference in thermal conductivity between a bonded and an unbonded area, will cause the unbonded area to turn dark immediately. Generally, the anomaly will remain dark for a few seconds after the heat has been removed, thus allowing time for the inspector to mark the area.

Since the basic principle of inspection depends on thermal gradient, there may be times when artificial cooling of the under surface will aid in detection of nonbonds. This can be accomplished by means of water or air cooling, or in certain cases by refrigeration. The degree of cooling will depend somewhat on the bond adhesive used, and the effect of temperature on the adhesive itself.

An alternative step in the method of the invention is to refrigerate the entire test structure, and inspect the surface immediately after removing it from refrigeration and exposing it to the ambient temperature.

Frequently, the image of the isotherms may be enhanced by merely placing the test article on a piece of cold metal, or other cool or cold surface.

With thin laminates, there may be times when the previously described technique of applying the heat to what might be considered the "reverse" side is preferable. For example, in the case of a laminate with a thin sheet of copper adhered to a thin sheet of reinforced plastic, the heat is best applied to the plastic surface, thereby allowing the copper to be the heat sink. If heat were to be applied to the copper, it would travel laterally along the copper before penetrating the plastic, and thereby give erroneous readings. The perimeter of anomalies (dark areas) may be marked with a conventional felt-tip marking pen or similar marker, preferably employing a water removable ink. Thus, a permanent record is made of the isothermal pattern.

Thermal image inspection aside from being used in adhesive bonding may be used on brazed honeycomb sandwich, providing the top sheet thickness is relatively thin.

I claim:

1. The method of nondestructive testing of bonded laminated structures and the like, comprising the steps of:
   applying a thermographic coating to the surface of the structure to be tested, as an integral sheet;
   irradiating said coating with ultraviolet radiation while applying thermal energy to said test structure thereby causing an isothermal pattern to appear upon the surface of said coating;
   marking upon said coating the location of any anomaly appearing in said isothermal pattern;
   terminating the application of radiant energy and thermal energy to said coating; and
   separating said coating sheet from the structure surface in a manner which permits retention of the marked coating sheet as a substantially permanent marked record.

2. The method of nondestructively testing a structure and making a record of such test, comprising the steps of:
   applying a thermographic phosphor including coating to the surface of the structure to be tested;
   forming said coating into a removable sheet;
   irradiating said sheet with ultraviolet radiation and applying infrared energy to said structure to produce an isothermal pattern on said coating;
   locating anomalies in said structure as indicated by areas of visible contrast within said isothermal pattern;
   marking the perimeter of said contrasting areas on said sheet;
   terminating the application of the ultraviolet radiation and the infrared energy to said coating; and,
   separating said removable sheet from the structure surface in substantially a single piece.

3. The method as defined in claim 2 including the step of limiting the surface temperature of said coating, while said infrared energy is being applied to said structure, to a maximum of 160° F.

4. The method as defined in claim 2 including the step of retaining said separated sheet as a permanent marked record.

5. The method as defined in claim 3 wherein the application of infrared energy comprises the step of: applying radiant thermal energy to the anterior surface of said test structure.

6. The method as defined in claim 3 wherein the application of infrared energy comprises the step of: applying radiant thermal energy to the posterior surface of said test structure.

7. The method as defined in claim 3 including the step of injecting compressed air between the confronting surfaces of said coating and said test structure to cause said coating to be separated from said test structure in a substantially integral sheet.

8. The method as defined in claim 3 including the steps of interposing an image transfer sheet between said coating and said test structure; and, transferring said markings on said coating to said test structure via said coating to said test structure via said transfer sheet.

9. The method as defined in claim 2 including the step of cooling said test structure below the ambient temperature in order to increase the temperature gradient within said structure in the region of said contrasting areas.

10. The method as defined in claim 4 including the step of making a photocopy of said marked record.